Figure 1:
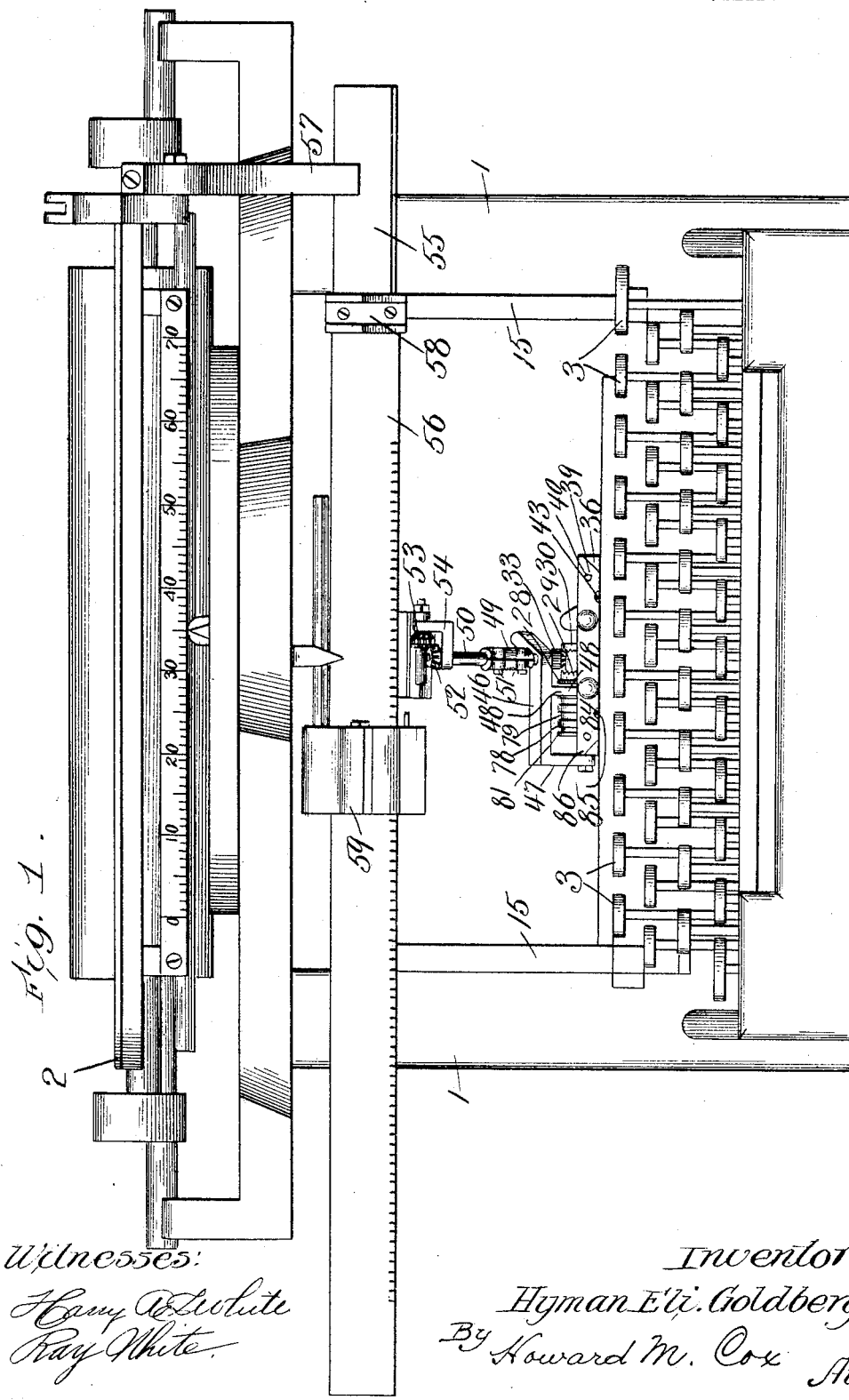

No. 782,554. PATENTED FEB. 14, 1905.
H. E. GOLDBERG.
CALCULATING MACHINE.
APPLICATION FILED MAR. 7, 1904.

7 SHEETS—SHEET 1.

Witnesses:
Harry A. White
Ray White

Inventor
Hyman Eli Goldberg,
By Howard M. Cox
Atty.

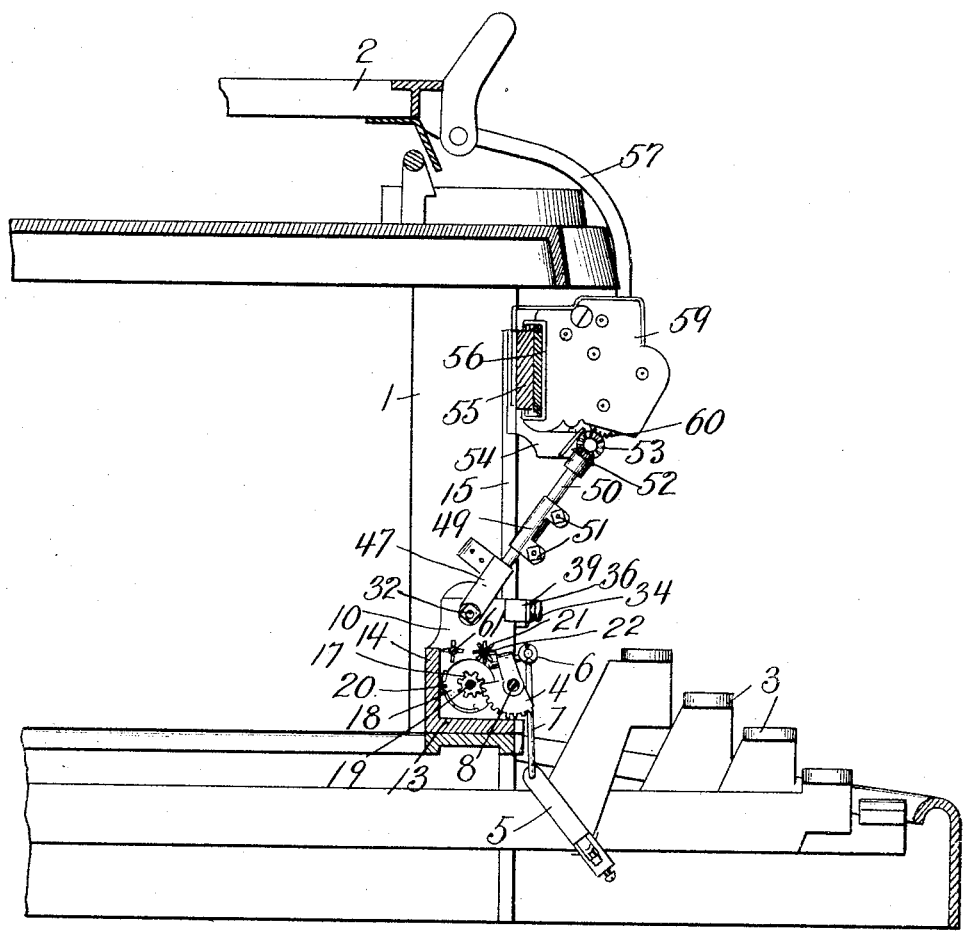

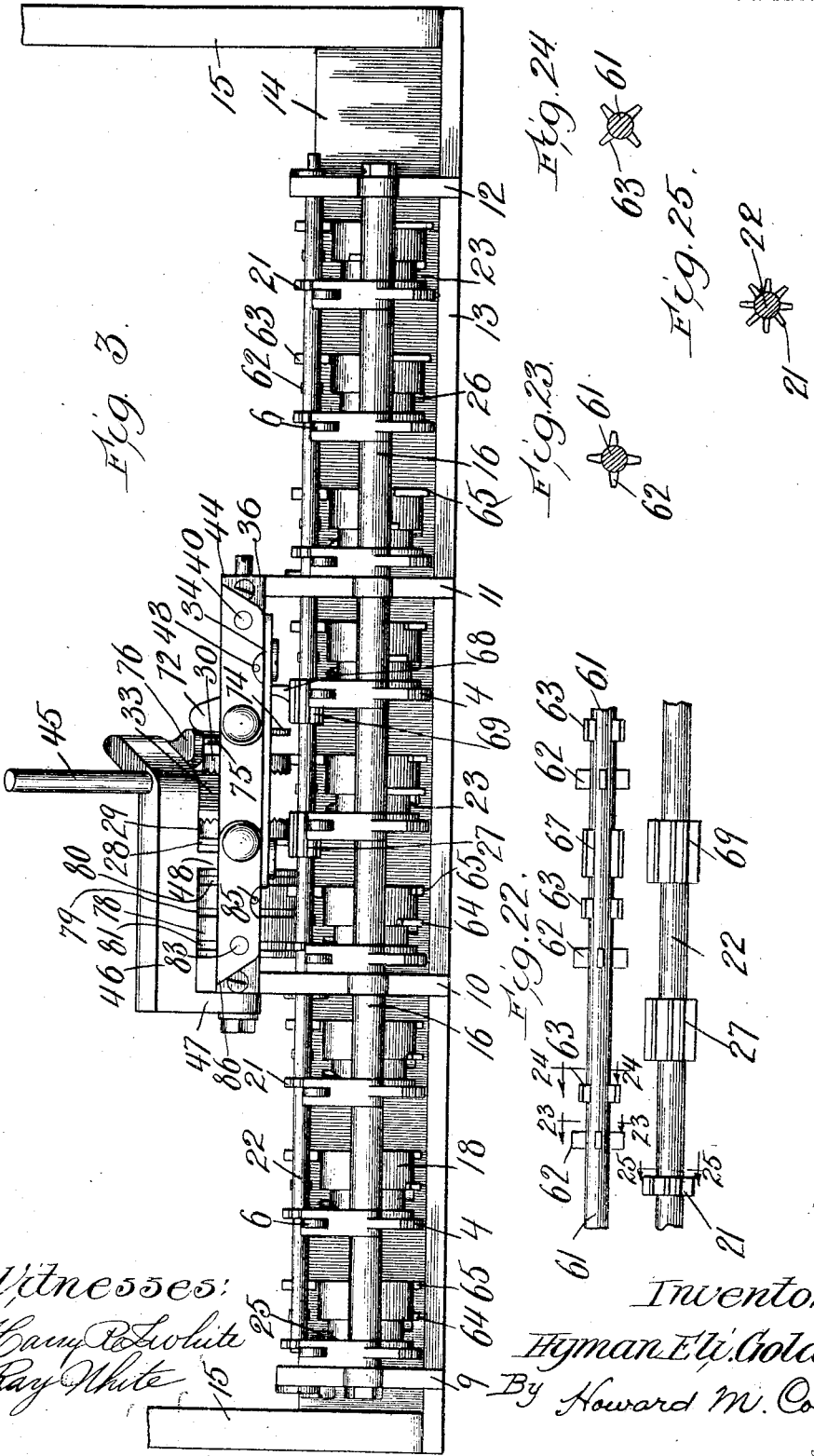

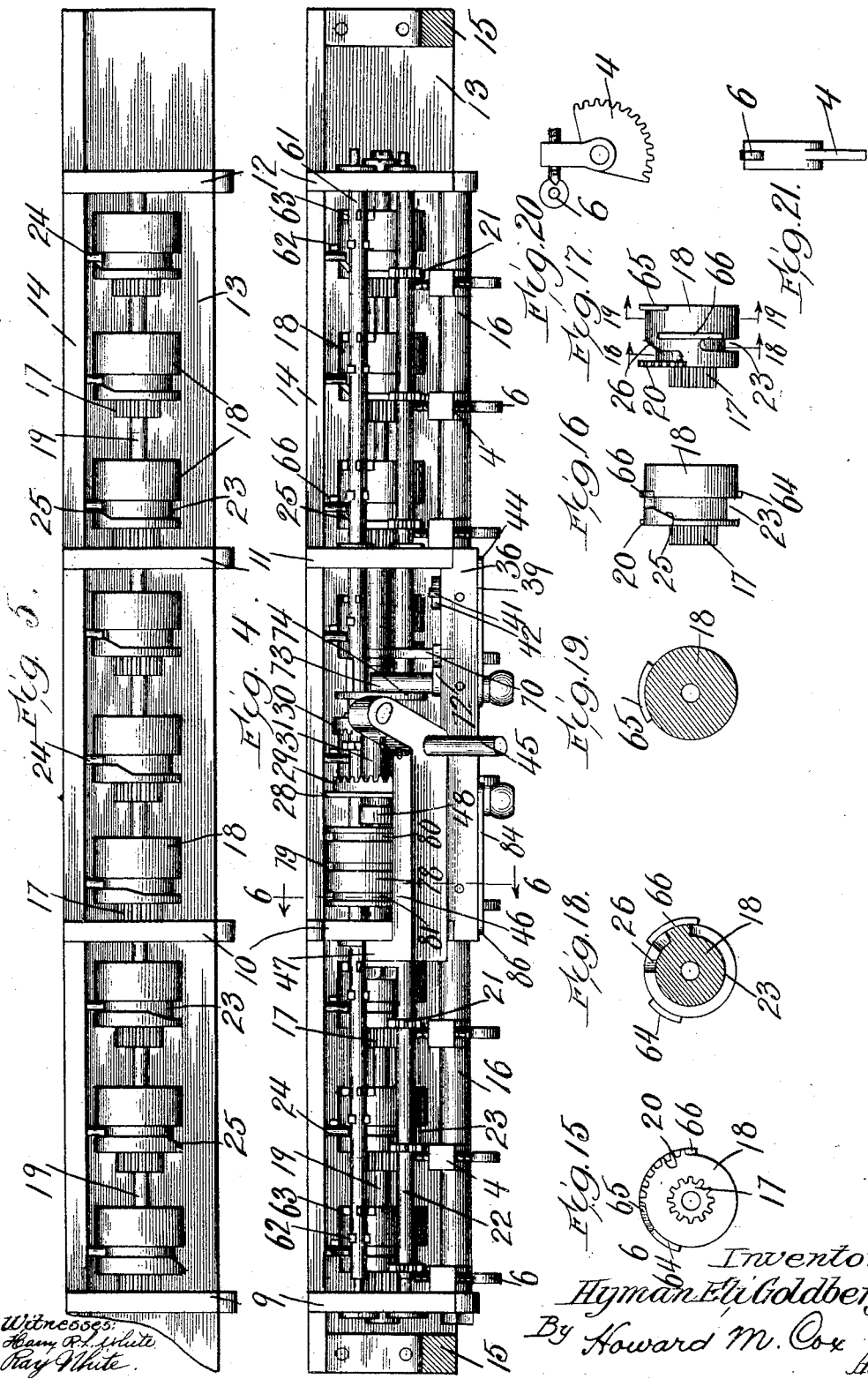

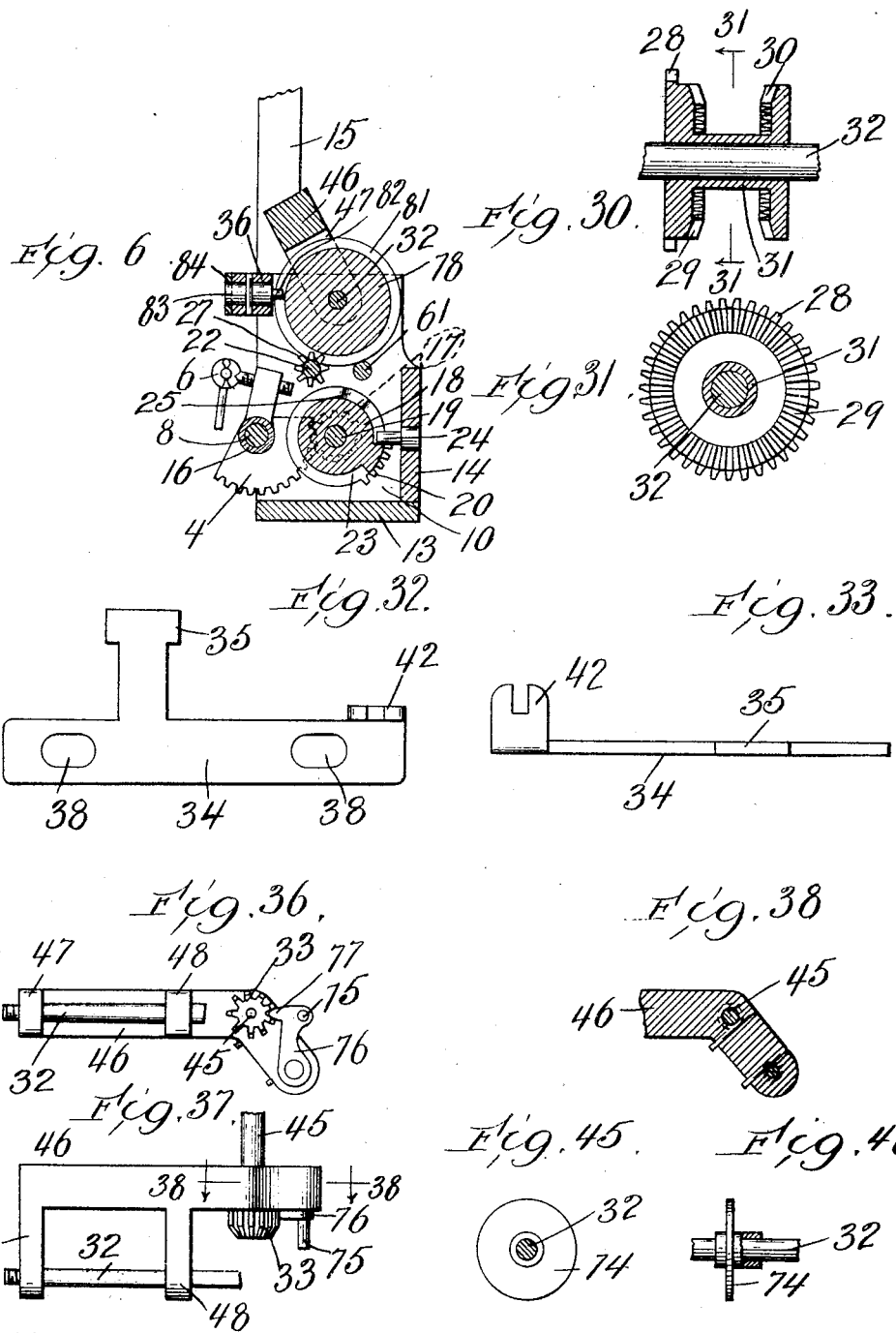

No. 782,554. PATENTED FEB. 14, 1905.
H. E. GOLDBERG.
CALCULATING MACHINE.
APPLICATION FILED MAR. 7, 1904.
7 SHEETS—SHEET 6.
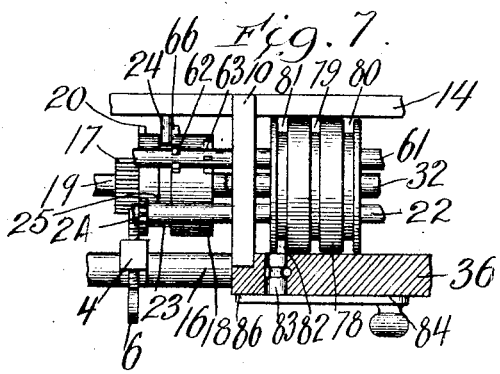
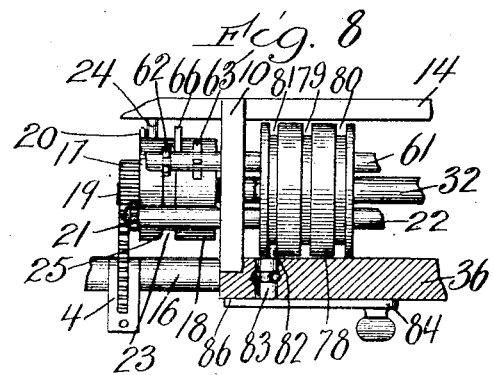
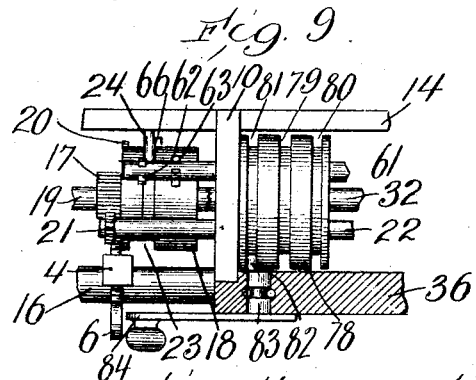
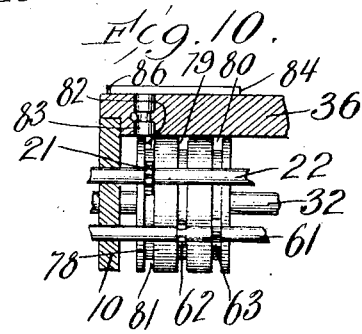
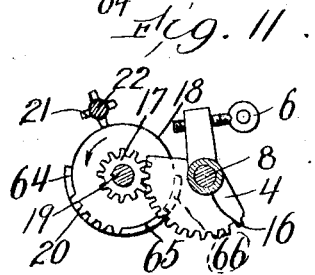
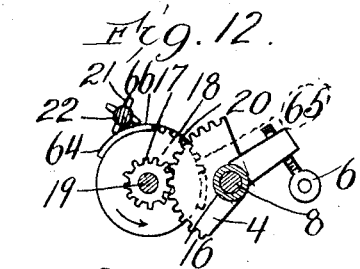
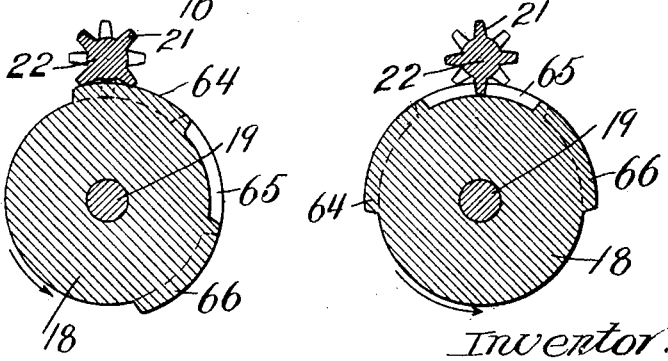
Witnesses:
Harry R. White,
Ray White
Inventor:
Hyman Eli Goldberg,
By Howard M. Cox
Atty.

No. 782,554. PATENTED FEB. 14, 1905.
H. E. GOLDBERG.
CALCULATING MACHINE.
APPLICATION FILED MAR. 7, 1904.
7 SHEETS—SHEET 7.
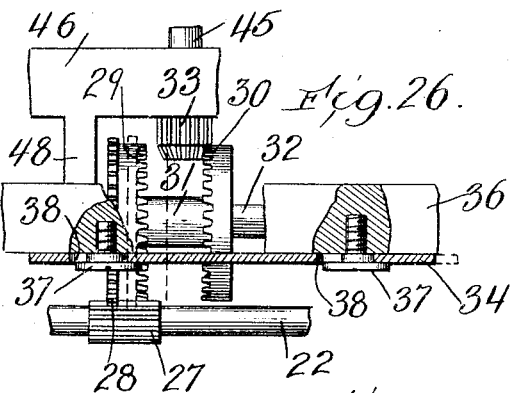
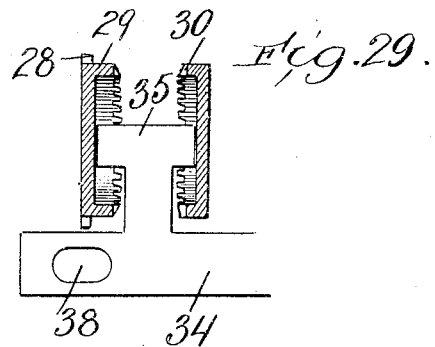
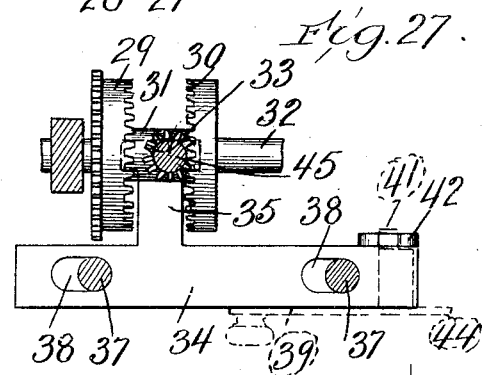
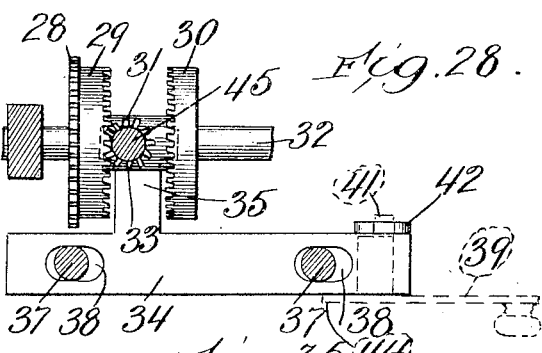
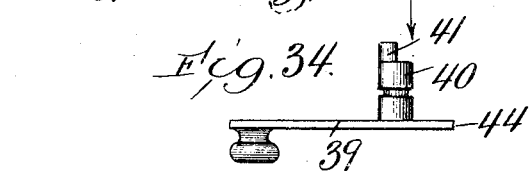
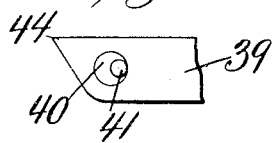
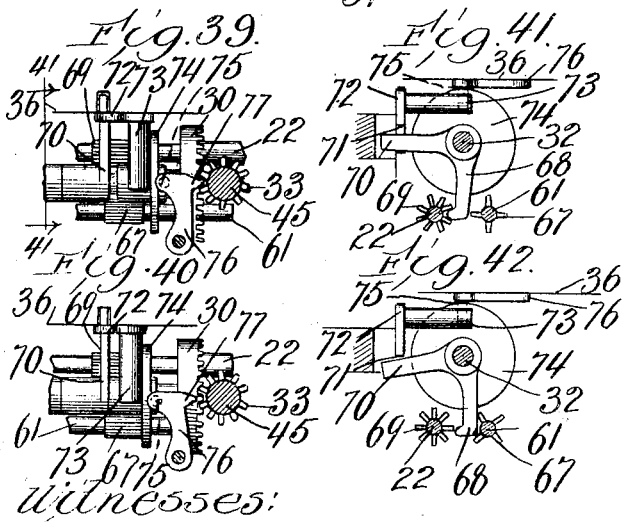
Witnesses:
Harry R. White
Ray White
Inventor:
Hyman Eli Goldberg,
By Howard M. Cox Atty.

No. 782,554.

Patented February 14, 1905.

UNITED STATES PATENT OFFICE.

HYMAN ELI GOLDBERG, OF CHICAGO, ILLINOIS.

CALCULATING-MACHINE.

SPECIFICATION forming part of Letters Patent No. 782,554, dated February 14, 1905.

Application filed March 7, 1904. Serial No. 196,935.

*To all whom it may concern:*

Be it known that I, HYMAN ELI GOLDBERG, a citizen of the United States, residing in the city of Chicago, county of Cook, and State of Illinois, have invented a new and useful Improvement in Calculating-Machines, of which the following is a specification.

My invention relates to calculating-machines, and is concerned more especially with the key-action and parts which operate the "setting-wheel," by which term I designate that member which drives the totalizing mechanism the amount required for that particular digit which is being set up.

While my invention may be used in connection with any calculating-machine, it is here illustrated as an attachment to a type-writer and makes use of the type-writer keys as a means of operation. It is obvious, however, that when constructed as an independent machine separate keys would be provided.

The mechanism here shown and claimed is well adapted to constitute a substitute for those parts which operate the receiving mechanism, which receiving mechanism and operating mechanism are described in my prior calculating-machine, Patent No. 741,961, issued October 20, 1903.

The general objects of my present invention are to provide a setting mechanism which is simple and durable in construction, positive in action, light of touch, and capable of operating at high speed.

Another object is to obtain a setting mechanism which may be readily adapted to almost any of the different forms of type-writers now in common use.

The parts of the device naturally group themselves under five different headings, to wit: First, the valuating mechanism, whereby the setting-wheel is rotated the proper amount for the particular digit to be set up; second, the reversing mechanism, whereby the machine may be set up to add or to subtract; third, the coupling device for rendering the calculator readily adaptable to various makes and styles of type-writers; fourth, the locking and alining mechanism, which serves as a correcting device for neutralizing the effects of gravity, inertia, and lost motion, and, fifth, the disconnecting mechanism, whereby the calculating parts may be thrown into and out of operative connection with the keys.

Some of the component parts of the machine, however, assist in performing more than one function, as will hereinafter appear.

I obtain these objects by the mechanism illustrated in the accompanying drawings, in which—

Figure 1 is a front view of a type-writer with my device attached thereto. Fig. 2 is a transverse sectional view of the parts shown in Fig. 1. Fig. 3 is a front assembly view of the parts embodying my invention. Fig. 4 is a plan view thereof. Fig. 5 is a plan view similar to Fig. 4, but with the upper parts removed for the purpose of exhibiting the shifting-cams. Fig. 6 is a transverse sectional view on line 6 6, Fig. 4. Figs. 7, 8, and 9 are top views of the grooved cylindrical shifter and related parts, by which the calculating parts may be thrown into and out of operation with the remaining parts of the mechanism. Fig. 10 is a view of said shifter looking from the bottom to show the manner in which the pinions on the digit-pinion shaft and on the locking-pinion shaft are engaged within the grooves of said shifter. Figs. 11 and 12 are side views showing the connection and manner of operation of the driving-sectors, digit-pieces, digit-pinions, and locking-pinions. Figs. 13 and 14 are vertical sectional views of the digit-pieces and locking-pinions, drawn to an increased scale and illustrating the locking and driving function of the disk sectors which are formed on said digit-pieces. Fig. 15 is a side view of a digit-piece. Figs. 16 and 17 are face views showing different positions of a shiftable digit-piece. Fig. 18 is a sectional view taken on line 18 18, Fig. 17. Fig. 19 is a sectional view taken on line 19 19, Fig. 17. Fig. 20 shows a driving-sector. Fig. 21 is a face or edge view of a driving-sector. Fig. 22 is a top view showing the relative positions of the digit-pinion shaft and the locking-pinion shaft. Fig. 23 is a sectional view of the locking-pinion shaft, taken on line 23 23, Fig. 22. Fig. 24 is a sectional view of said shaft, taken on the line 24 24, Fig. 22. Fig. 25 is a sectional view of the digit-pinion shaft, taken on line 25 25, Fig. 22. Fig. 26 is a fragmentary assembly view showing the reversing mechanism. Figs. 27 and 28 are similar to Fig. 26 and show the operation of the reversing-plate. Fig. 29 illustrates the relationship between the reversing-plate and the reversing gear-wheels. Fig. 30 is a sectional view of the reversing gear-wheels, taken through the axis thereof. Fig. 31 is a sectional view taken on line 31 31, Fig. 30. Figs. 32 and 33 are face and edge views, respectively, of the reversing-plate for shifting the reversing gear-wheels. Fig. 34 is a view of the eccentrically-formed lever which operates the shifter or barrel whereby the mechanism is disconnected from the keys. It is similar to the lever which operates the reversing-plate, except that said levers are "rights" and "lefts." Fig. 35 is a fragmentary view of the end of the disconnecting-lever looking in the direction of the arrow, Fig. 34. Figs. 36 and 37 are front and plan views, respectively, of the holder for the setting-rod, reversing gear-wheels, and related parts. Fig. 38 is a sectional view on line 38 38, Fig. 37. Figs. 39 and 40 are fragmentary assembly plan views from the rear, showing the operation of the setting-pinion and means for locking and releasing the digit-pinion shaft. Figs. 41 and 42 are fragmentary assembly views looking in the direction of the arrows on the line 41 41, Fig. 39. Fig. 43 is a perspective view of the corrector-detent which locks the digit-pinion shaft. Fig. 44 is a perspective view of the lever which operates said detent, the manner of coöperation of said detent and lever being illustrated in Figs. 39 to 42, inclusive. Figs. 45 and 46 are face and edge views, respectively, of the transferring-disk, the operation whereof is best illustrated in Figs. 39 to 42, inclusive.

Similar numerals refer to similar parts throughout the several views.

The framework 1 of the type-writer supports the laterally-shiftable type-writer carriage 2 and the type-writer keys 3. Each of the number-keys of the type-writer except the "0" key is connected to a driving-sector 4 in such manner that the depression of the key will cause the movement of the sector, and the preferred means of connection comprise the riders 5, secured to the keys, the screw-eyes 6, which screw into said sectors, and the links 7, which connect said key-riders to said screw-eyes. Said screw-eyes screw into said sectors, and therefore by screwing or unscrewing the same the distance from the center of the screw-eye to the center of the sector may be varied, thereby affording means for neutralizing any inequality in the amount of motion of the type-writer keys. The ends of links 7 extend through the eyes of said screw-eyes, and thereby prevent their accidental rotation and disadjustment. Said sectors are mounted so as to rotate independently upon the shaft 8, which is supported in fixed position in the walls or uprights 9, 10, 11, and 12. For convenience of manufacture and to facilitate attachment of my calculating mechanism to a type-writer I prefer to mount all of the calculating parts in a self-contained framework separate from the framework of the type-writer, and although the arrangement and construction of this separate framework may be greatly varied the present form is a convenient one and comprises the base-plate 13, back wall 14, and posts 15 15 in addition to the above-mentioned walls 9, 10, 11, and 12.

The aforesaid sectors 4 are confined to their proper location on shaft 8 by any suitable means, such as the spacing-collars 16 16. Said sectors are provided with gear-teeth for driving the gear-wheels 17 on the digit-pieces 18. There is one of said digit-pieces for each of said driving-sectors, and they are mounted on the fixed shaft 19, so as to be both independently revoluble and independently shiftable thereon. Said gear-wheels 17 are wide enough to remain in mesh with said sectors in all positions of said digit-pieces. Said shaft 19 is carried by walls 9, 10, 11, and 12. Each of said digit-pieces 18 has thereon a toothed digit-sector or incomplete toothed wheel 20, the number of teeth thereon depending upon the value of the key driving it. In the present machine the "1" sector has one tooth, the "2" sector two teeth, and so on. Each of said digit-sectors is designed to mesh during its positive stroke with one of the digit-pinions 21 21, rigidly fixed on the digit-pinion shaft 22. Said shaft is rotatably mounted in the walls 9, 10, 11, and 12 of the framework, and by preference said pinions 21 have eight teeth and are formed integral with said shaft.

During the positive rotation of the digit-pieces 18 the digit-sectors 20 will mesh with and rotate their respective digit-pinions 21 the proper amount to set up the particular digit which such digit-sector represents; but in order to prevent the digit-sectors from meshing with the digit-pinions during the return stroke of said digit-sectors means is provided for automatically shifting the digit-pieces and the sectors thereon to one side after the rotation of the digit-pinion is completed. To obtain this shifting action, said digit-pieces 18 have circumferential cam-grooves 23, which receive the cam-pins 24, projecting from the rear wall 14. In one side wall of each of said cam-grooves there is a bevel 25, with the result that when during the positive rotation of digit-piece 18 said bevel strikes its respective cam-pin 24 said digit-piece is shifted sidewise along shaft 19 to a position where said digit-sector 20 is out of line, and consequently out of operative relationship, with its respective digit-pinion 21. I therefore term said bevel 25 the "outshifting-cam." Conversely, there is a bevel 26 in the opposite side wall of each of said cam-grooves 23, which when rotated into contact with the respective pin 24 during the negative or return rotation of the digit-piece causes said digit-piece to be shifted back again to a position where its digit-sector will be in line with the respective digit-pinion. Hence I term said bevel 26 the "inshifting-cam." The outshifting-cam and inshifting-cam are located far enough apart circumferentially to permit the digit-piece to stay in one shifted position during its entire period of activity upon the digit-pinions 21 and yet during the return rotation avoid contact with said digit-pinions. In operation, therefore, the depression of any one of the figure-keys of the typewriter will cause a positive rotation of the digit-pinion shaft 22. Thus the digit-pinion shaft always rotates in the same direction, and the amount of rotation will depend upon the numerical value of the key depressed. The above-described parts of the machine may therefore be considered to constitute the valuating mechanism.

It will be noted that a digit-piece is positively geared with its digit-pinion during its forward motion and that therefore in case of an incomplete motion of a digit-piece such digit-piece and digit-pinion will both return to their original position without producing any effect. The valuating mechanism will therefore register correctly or not at all.

*The reversing mechanism.*—In order to perform substraction as well as addition, means are provided for reversing the direction of rotation of the setting-pinion, hereinafter described. Upon the digit-pinion shaft 22 a wide-faced pinion 27 is located in position to be always in mesh with the toothed gear 28, which operates the reversing bevel gear-wheels 29 30. In the present instance said gears 28, 29, and 30 are formed of a single piece with the hub or sleeve 31, which latter is slidably and rotatably mounted on shaft 32, carried by the walls 10 and 11. Said bevel-gears 29 and 30 are adapted to mesh with and drive the setting-pinion 33, and it is obvious that the direction of rotation of said setting-pinion will depend upon which one of said gears 29 and 30 is driving it. Said bevel-gears are far enough apart so that when one of them is in mesh with said setting-pinion the other of them will be out of mesh therewith. The relation of said bevel-gears to said setting-pin is best illustrated in Figs. 26, 27, and 28. The shifting of said bevel-gears 29 30 is accomplished by means of the reverser 34, the precise construction of which is not essential, but in the present instance consists of a flat plate having a head 35, adapted to make sliding contact with the smooth inner surfaces of both of the bevel-gears 29 30 simultaneously. Said reverser is slidingly mounted on the fixed bar 36 by means of the heads of the screws 37 37. Said screws pass freely through the slots 38 38 in said reverser and screw into said bar, preferably from the under side thereof, as shown. In the preferred construction bar 36 aforesaid is fastened to the walls 10 and 11 at the front edges thereof and is rectangular in cross-section.

Reverser 34 is shifted lengthwise of bar 36 by means of the reversing-lever 39, which rotates the shaft 40, journaled in said bar 36. Upon the inner end of said shaft is the pin 41, which is set eccentrically thereon and is adapted to engage the slotted arm 42 on said reverser. In the present arrangement said lever 39 is adjacent to the front surface of bar 36 and said arm 42 is bent upwardly, so as to lie adjacent to the rear surface thereof. The parts are so related that when said lever is thrown over to one position—as, for example, the one shown in Fig. 27—the setting-pinion 33 will be engaged by the bevel-gear 30 to perform subtraction; but when said lever is thrown to the opposite position—as, for example, the one shown in Fig. 28—the setting-pinion will be engaged by the companion bevel-gear 29 to perform addition, or vice versa. In order to limit the motion of said lever, a stop-pin 43 is placed in said fixed bar. In one position the lever 37 strikes against the stop-pin, and in the other position said pin is contacted by the extension 44 on said lever.

The coupling mechanism is designed to supply the means whereby the motion of the reversible setting-pinion may be communicated to the number-wheels and totalizing mechanism under various conditions due to difference in size and construction of the different styles and makes of type-writers. The necessity for such a "universal" coupling mechanism, as it may be termed, would of course be lacking when used in an independent calculating-machine unless, perhaps, such coupling might be retained for convenience of manufacture or adjustment.

The setting-pinion 33 is rigidly secured to the setting-rod 45, which is journaled in the bar 46 of the setting-rod holder. The preferred method of retaining said shaft 45 in bar 46 is by circumferentially grooving said rod and inserting a pin in said bar to enter said groove, as shown in Fig. 38. Said holder comprises, in addition to said bar 46, the arms 47 and 48, which carry said bar and are apertured to receive the above-mentioned shaft 32, so as to swing freely about said shaft as an axis. The parts are so constructed that when the said bar 46 swings about its axis the setting-pin 33 will always remain in mesh with either bevel-gear 29 or bevel-gear 30, and consequently the setting-rod may be swung to any angle about shaft 32 as an axis without disengaging said setting-wheel from said bevel-gears. It follows that the motion of said setting-pinion may be transmitted in any direction forward or back of said shaft 32.

Means of adjustment for distances from shaft 32 is afforded by the clamp 49, by which setting-rod 45 is connected to rod 50. Said clamp consists, preferably, of a split collar adapted to receive said rods 45 and 50 and be tightened thereonto by means of screw-bolts 51. At the upper extremity of said rod 50 is a bevel-pinion 52, adapted to mesh with the beveled teeth on the side of the setting-wheel 53. Said setting-wheel is provided also with spur-teeth the faces whereof are parallel to the direction of travel of the type-writer carriage 2. The wheels 52 and 53 are held in proper relationship by the bracket 54, which is carried by the fixed guide-bar 55. Said guide-bar is attached to the posts 15 15 and lies parallel to the direction of motion of the type-writer carriage. The bar 56 is slidingly mounted on said guide-bar and caused to travel lengthwise thereon by the arm 57, which is secured to the type-writer carriage and adapted to fit at its lower extremity into the socket 58 on the slide 56. In Fig. 1 arm 57 is shown to be disengaged from said socket 58 for more clearly illustrating the construction. The receiving mechanism 59 is mounted on said slide 56 in such position that the setting-wheel 53 will engage suitable operating parts thereof as the motion of the type-writer carriage causes said receiving mechanism to travel across the face of said setting-wheel. The construction and arrangement, however, of the receiving-mechanism framework for supporting the setting-wheel 53, slide 56, and the means for supporting and operating the latter are not directly concerned with my present invention. My present invention relates only to the setting-wheel 53 and parts which contribute directly and indirectly to its operation and support. The setting-wheel and parts which influence it may be used in connection with various receiving and totalizing mechanisms—such, for example, as the one shown and described in my prior patent above referred to, No. 741,961, of October 20, 1903.

The locking and alining mechanism is designed to prevent accidental movement of the operating parts and to correct slight errors of position due to excessive or insufficient movement of the operating parts. The locking-shaft 61 is provided with a series of locking-pinions 62 and a series of companion locking-pinions 63, one for each of the cam-gears 18. These pinions each have four teeth corresponding to the alternate teeth of an eight-toothed gear-wheel—in other words, are like an eight-toothed gear-wheels from which the alternate teeth have been cut away. These locking-pinions may be formed from gears having more or less than eight teeth, if desirable. By preference said pinions form an integral part of said shaft 61, and they are so arranged thereon that a tooth on one is opposite to the space between teeth on the other, so that when looking at the end of their shaft have the appearance of forming a complete gear, as illustrated in Fig. 25. Said locking-shaft 61 is mounted in walls 9, 10, 11, and 12, so as to rotate freely therein.

Locking-pinions 62 and 63 are alternately locked and rotated by means of the raised disk-like portions 64, 65, and 66, which extend circumferentially part way around the cam-gears 18. Of these disk sectors 64 and 66 are in one line circumferentially and designed to operate locking-pinion 62, while disk sector 65 is designed to operate the companion locking-pinion 63. Said "disk sectors," as they may be termed, are so constructed and the locking-pinions are so mounted in relation thereto that when one of said disk sectors approaches a tooth on the locking-pinion the latter will be rotated one tooth-space, (in this case one-eighth of a revolution) and then immediately be locked by reason of the said disk sector entering the space between the driven tooth and the next succeeding one. Said disk sectors are so arranged that when viewed from the side (that is to say, looking at them in the direction of the length of their axes) the disk sectors 64 and 66 will be seen to be upon different parts of the circumference, and the disk sector 65 will appear to lie between them with its ends apparently overlapping the adjacent extremities of the disk sectors 64 and 66, so that the overlapping portions will each correspond to the form of a gear-tooth, (see Figs. 15 and 16.) The circular distance from one of these overlapping teeth to the other will be different on each one of the digit-pieces, and the distance between them will correspond to the number of teeth in the respective digit-sectors 20. The greater the number of teeth in said digit-sectors the greater will be the distance between said overlapping teeth formed by said disk sectors, and the purpose is so to design the mechanism that by means of said digit-piece locking-shaft 61 shall be locked prior to the commencement of its rotation, then rotated one tooth-space just prior to the commencement of rotation of the digit-pinion shaft 22 and shall remain locked by said sector-disk 65 during the period of rotation of said digit-pinion shaft, and then rotated one tooth-space more immediately after said digit-pinion shaft has completed its rotation, and then be again locked. The action of said sector-disks on the locking-pinions will occur only during the positive rotation of the digit-pieces 18, said digit-pieces and disks thereon being shifted out of operative position during the return stroke by reason of the action of the outshifting-cam 25.

The purpose of the above-described intermittent motion of the locking-shaft 61 is the alining and locking of the digit-pinion shaft 22 and setting-pinion 33 after they have completed their rotation, due to the depressing of any one of the type-writer keys. This locking effect is produced by means of the detent-pinion 67, rigidly fixed upon and preferably forming an integral part of the locking-pinion shaft 61. Said pinion 67 contains four teeth of an eight-toothed gear-wheel, each alternate tooth being removed. The teeth of said detent-pinion 67 are adapted to make contact with the back of the detent-corrector 68. Said detent-corrector is pivotally mounted upon shaft 40, and its extremity is adapted to enter between the teeth of the pinion 69 on the digit-pinion shaft 22 to thereby lock said pinion and shaft. Said detent-pinion 67, detent-corrector 68, and pinion 69 are so formed and arranged in relation to each other that when any tooth of pinion 67 extends directly toward said corrector the latter will be held between the teeth of pinion 69, (see Fig. 41;) but when said pinion 67 has been rotated one tooth-space from its last described position said corrector may back off from said pinion 69, and thereby release the same. (See Fig. 42.) In normal condition when the parts are at rest and the type-writer keys are up some one of the teeth of the detent-pinion 67 will extend toward the corrector 68 to thereby retain the pinion 99 and digit-pinion shaft 22 in locked condition.

As a result of the above-described construction and periods of operation of the parts it follows that just before any digit-pinion commences to rotate the locking-pinion shaft 61 will be rotated one-eighth of a revolution or one tooth-space, thereby causing the detent-pinion 67 to release the detent-corrector 68, and said detent-pinion will remain in this position until just after the completion of the rotation of the digit-pinion shaft, at which time said locking-pinion shaft will be rotated one-eighth of a revolution, or one tooth-space, to thereby reëngage said corrector 68, and consequently lock said pinion 69 and the digit-pinion shaft. The corrector 68 does not accomplish merely the locking of the digit-pinion shaft 22, but by causing the wedge-shaped extremity of said corrector to enter between the teeth of said pinion 69 rotates said pinion 69 forward or backward a slight amount, if necessary, to correct the position of said pinion and the shaft upon which it is located. This causes an alining of all of the digit-pinions on shaft 22, so that the proper meshing of the digit-pieces 20 with the digit-pinions 21 is assured. In order that the detent 68 may also cause the locking of the setting-pinion 33, said detent is provided with an arm 70, adapted to be engaged by the operating edge 71 of the lever 72. Said lever 72 is pivoted to the rear side of the fixed bar 36 and is provided with a pin 73, which extends rearwardly to make contact with the transmitting-disk 74. Said disk is slidingly mounted upon shaft 32 and operates the pin 75 on the setting-pinion aliner 76. Said setting-pinion aliner is pivotally mounted upon the bar 46 in such position that the wedge-shaped portion 77 of said aliner may enter between the teeth of the setting-pinion 33, and thereby correct the position thereof. The aliner 76 is mounted in the swinging bar 46, and the purpose of introducing the shifting transmitting-disk 74 between pin 73 and pin 75 is that the pin 75 may always be in operative connection with pin 73 for any position of said holder. Inasmuch as said setting-pinion will commence to rotate at the same time that the digit-pinion shaft 22 commences to rotate, said detent will be permitted to recede from said pinion 69 early enough not to interfere with the operation of said digit-pinion shaft. The alining effect of the detent 68 and aliner 76 is important for neutralizing the effect of backlash or inertia.

*The disconnecting mechanism.*—It is frequently desirable to operate the figure-keys of the type-writer without producing any effect upon the calculating attachment, and for this purpose means are provided whereby the calculating parts may be readily thrown into or out of operative connection with the keys. The digit-pinion shaft 22 and locking-shaft 61 are so mounted within the side walls 9, 10, 11, and 12 that they may be shifted lengthwise a distance sufficient to throw the digit-pinions 21 and locking-pinions 62 63 out of the line of operation of the digit-sectors 20, and sector disks 64 65 66 as well, during the forward stroke of the digit-pieces 18, as on the return stroke thereof. (See Figs. 7, 8, 9, and 10.) This shifting of said shafts is accomplished by means of the shifter 78, which is mounted upon shaft 40 in such manner as to be movable longitudinally thereon. Said shifter may be constructed in any suitable form to engage said shafts 22 and 61; but for convenience of manufacture in the present instance said shifter consists of a cylinder having three grooves 79, 80, and 81 therein. The grooves 79 and 80 are adapted to engage two companion locking-pinions 62 63, and the groove 78 is adapted to engage one of the digit-pinions 21. Said groove 81 also engages the pinion 82, which is eccentrically placed upon the inner extremity of the disconnecting-shaft 83. Said shaft is journaled in the fixed bar 36 and is operated by means of the disconnecting-lever 84, which in the present instance is pivoted to the front of said bar and for the purpose of symmetry resembles the reversing-lever 39. A stop-pin 85 is rigidly fixed in the front of said fixed bar 36 for limiting the movement of said lever in one direction, and said lever is limited in its movement in the opposite direction by reason of the extension 86 thereon adapted also to contact said stop-pin 85.

The above-described mechanism is here shown in its preferred form; but I do not wish to be understood as limiting myself to any specific construction and arrangement of the parts. Thus the purpose of shifting the digit-pieces 18 sidewise is to disconnect same from the parts driven thereby; but it is within my contemplation that this may be accomplished in other ways—for example, by moving said digit-pieces away from the axis of the digit-pinions 21 and locking-pinions 61 62.

It is not necessary that the digit-pieces 18 be rotatable, as I am aware that sliding toothed racks may be substituted and produce the same results, and in the accompanying claims where reference is made to rotating sectors sliding racks are to be understood as included, on the grounds that a sliding rack is merely a rotating toothed sector having an infinite radius.

Some of the parts of this device—for example, the parts 18 and part 78—have more than one function, and when such parts are referred to by name or reference-numeral in any claim it is not the entire form or configuration that is implied, but only so much thereof as is essential to the performance of the function indicated in such particular claim. It is necessary to name the parts; but the name of a part is not necessarily intended as a definition of its particular construction.

Attention is directed to my pending application for a calculating-machine, Serial No. 210,158, filed May 28, 1904.

Having thus described my invention, what I claim as new, and desire to secure by Letters Patent, is—

1. In a calculating-machine; a digit-pinion shaft for setting up the digits; a series of digit-pinions fixed to said shaft; laterally-shiftable digit-pieces for operating said pinions; means for independently rotating said digit-pieces; and means for shifting said digit-pieces laterally into and out of operative line with said digit-pinions to thereby drive said digit-pinions and shaft in one direction only.

2. In a calculating-machine; a series of independent digit-pieces independently rotatable forward and back about a fixed axis; a digit-pinion shaft rotating always in the same direction; a series of digit-pinions rigidly fixed upon said shaft; one of said digit-pieces for operating each of said digit-pinions; means for bringing any one of said digit-pieces into gear with its digit-pinion for the forward motion of said digit-piece; and means for disconnecting said digit-piece from its pinion for the return motion of said digit-piece.

3. In a calculating-machine, a digit-pinion shaft for setting up the digits; a series of digit-pinions fixed to said shaft; shiftable digit-pieces mounted on a fixed axis for operating said pinions; means for independently rotating said digit-pieces; and means for shifting said digit-pieces into operative line with said pinions prior to the positive rotation of said sectors, and out of operative line prior to the negative rotation, whereby said digit-pinion shaft rotates always in the same direction.

4. In a calculating-machine, a series of independent toothed reciprocatory digit-pieces; a digit-pinion shaft; a series of digit-pinions rigidly fixed upon said shaft, one of said digit-pinions for each of said digit-pieces; a cam for bringing a digit-piece into operative line with its digit-pinion to drive the latter forward; and a second cam for subsequently bringing such digit-piece out of said operative line to thereby avoid engagement with its digit-pinion during the return motion of said digit-piece.

5. In a calculating-machine, a series of independent toothed reciprocatory digit-pieces rotatable forward and back upon a fixed axis; a digit-pinion shaft rotating always in the same direction; a series of digit-pinions rigidly fixed upon said shaft, one of said digit-pinions for each of said digit-pieces; a cam for bringing any one of said digit-pieces into position to engage its digit-pinion during the motion of said digit-piece in one direction; and a second cam for bringing such digit-piece out of operative position to thereby avoid engagement with its digit-pinion during the return motion of such digit-piece.

6. In a calculating-machine, a series of independently-shiftable and independently-reciprocatory toothed digit-pieces; a digit-pinion shaft rotating always in the same direction; a series of digit-pinions rigidly fixed upon said shaft, one of said digit-pinions for operating each of said digit-pieces; a cam for shifting any one of said digit-pieces into line to gear with its digit-pinion for the forward motion of said digit-piece; and a second cam for shifting the digit-piece out of line with its digit-pinion to avoid engagement therewith during the return motion of said digit-pieces.

7. In a calculating-machine, a series of toothed independently-reciprocatory digit-pieces rotatable forward and back upon a fixed axis; a digit-pinion shaft rotating always in the same direction; a series of digit-pinions rigidly fixed upon said shaft, one of said digit-pinions for each of said digit-pieces; a cam for shifting any one of said digit-pieces into line to gear with its digit-pinion during the rotation of said digit-piece in one direction; and a second cam for shifting the digit-piece out of line with its digit-pinion to avoid engagement therewith during the return rotation of said digit-piece.

8. In a calculating-machine, a digit-pinion shaft for setting up the digits; a series of digit-pinions rigidly fixed to said shaft; independently-shiftable digit-pieces for operating said pinions; means for independently rotating said digit-pieces; and means for independently shifting said digit-pieces into operative line with said pinions prior to the positive rotation of said digit-pieces and out of operative line subsequent to the completion of the rotation of said digit-pinions.

9. In a calculating-machine, a digit-pinion shaft for setting up the digits; a series of digit-pinions rigidly fixed to said shaft; independently-rotatable and independently-shiftable digit-pieces for operating said pinions; means for independently rotating said digit-pieces back and forth; and means for shifting said digit-pieces into operative line with said pinions prior to the positive rotation of said digit-pinions and out of such operative line when the rotation of said digit-pinions has been completed.

10. In a calculating-machine, a digit-pinion shaft for setting up the digits; a series of digit-pinions rigidly fixed to said shaft; independently-rotatable and independently-shiftable digit-pieces for operating said pinions; means for independently rotating said digit-pieces back and forth; and a cam device for shifting said digit-pieces into operative line with said pinions prior to the positive rotation of said digit-pinions and out of such operative line when the rotation of said digit-pinions has been completed.

11. In a calculating-machine, a digit-pinion shaft for setting up the digits; a series of digit-pinions rigidly fixed to said shaft for rotating the same; shiftable digit-pieces for driving said pinions; keys; key connections for independently rotating said digit-pieces to drive said pinions and pinion-shaft; cams on each of said digit-pieces for shifting the same into operative line with their pinions prior to the positive rotation of said digit-pieces; other cams on said digit-pieces for shifting the same out of operative line prior to their negative rotation; and a fixed pin for operating said cams.

12. In a calculating-machine, a digit-pinion shaft adapted to be rotated always in the same direction for setting up the digits; a series of digit-pinions rigidly secured to said shaft; independently-shiftable and independently-rotatable digit-pieces; means for rotating said digit-pieces back and forth; digit-sectors forming a part of said digit-pieces for driving said digit-pinions the proper amount to set up the digits; cam-grooves in said digit-pieces; and fixed cam-pins projecting into said cam-grooves whereby said digit-sectors are shifted into line with said digit-pinions to rotate said digit-pinions forward, and are shifted out of line with said digit-pinions after the forward rotation of said digit-pinions is complete, said digit-sectors and digit-pinions being therefore in mesh during the entire forward motion of the digit-pinions whereby the digit-pinions will be returned to their first position if the forward rotation of said digit-sectors is not completed.

13. In a calculating-machine, the combination, with the keys, of a digit-pinion shaft for setting up the digits; a series of digit-pinions rigidly fixed on said shaft for rotating the same; and a series of key-driven, independent toothed digit-pieces rotating about a fixed axis, said digit-pieces being connected to said keys and rotating back and forth responding to the motion of said keys, and the teeth of said digit-pieces being in mesh with said digit-pinions during the downstroke of the keys, and out of mesh during the upstroke of said keys whereby a second key may commence its positive stroke as soon as the first key has completed its positive stroke.

14. In a calculating-machine, a digit-pinion shaft for setting up the digits; a series of digit-pinions rigidly fixed to said shaft; shiftable digit-pieces for driving said pinions; keys; key connections for independently rotating said digit-pieces to drive said pinion and pinion-shaft; and means for shifting said digit-pieces into operative line with said pinions prior to the positive rotation of said digit-pieces and out of operative line near the end of their positive rotation, whereby said digit-pinions and pinion-shaft are rotated always in the same direction and reciprocal motion is limited to the digit-pieces and parts whereby they are operated.

15. In a key-operated calculating-machine, a digit-pinion shaft rotating always in the same direction for setting up the digits; a series of digit-pinions rigidly secured to said shaft; a series of toothed driving-sectors each having a key connection and rotating forward and back with the key motion; and a single rotatable and laterally-shiftable member interposed between each of said driving-sectors, and its digit-pinion, said interposed member being at all times in mesh with its sector but in mesh with its digit-pinion during rotation in one direction only.

16. In a calculating-machine, a toothed driving-sector for setting up a digit; a number-key; and connections between said key and said sector for operating the latter, said connection comprising a link and eye, and screw connections between said eye and said driving-sector to thereby provide means of adjustment between a key and its sector, to thereby neutralize any inequality in the amount of motion of said keys.

17. In a calculating-machine, a toothed driving-sector for setting up a digit; a number-key; and connections between said key and said sector for operating the latter, said connections comprising a member screwing into said sector to thereby afford means for neutralizing any inequality in the amount of motion of said keys.

18. In a calculating-machine, toothed driving-sectors for setting up the digits; screw-eyes screwing into said sectors; number-keys; and connections between said number-keys and said screw-eyes for imparting the key motion to said screw-eyes, the screw construction of said eyes affording means of adjustment for neutralizing any inequality in the amount of motion of said keys.

19. In a calculating-machine, toothed driving-sectors for setting up the digits; screw-eyes screwing into said sectors; number-keys;

and links connected to said keys and to the eyes of said screw-eyes for imparting rotary motion to said sectors.

20. In a calculating-machine, the combination with the keys, of a digit-pinion shaft rotating always in the same direction to set up the digits; a series of digit-pinions rigidly fixed on said shaft; a series of toothed gears meshing with said pinions during the positive rotation thereof only; and means for adjustably connecting each of said series of toothed gears to one of said keys.

21. In a calculating-machine, the combination of keys; a pinion-shaft always rotating in the same direction for setting up the digits; a series of digit-pinions rigidly secured to said shaft; a series of toothed driving-sectors, each having an adjustable connection to one of the keys and rotating forward and back with the key motion; and a single rotatable and laterally-shiftable member interposed between each of said driving-sectors and its digit-pinion, said interposing member being at all times in mesh with its sector but in mesh with its digit-pinion during the rotation in one direction only.

22. In a calculating-machine, a digit-pinion shaft; a series of digit-pinions fixed thereto for rotating the same; reciprocatory pieces for rotating said digit-pinions, said reciprocatory pieces during their motion in a positive direction being in gear with said digit-pinions and out of gear with said pinions during the negative motion of said reciprocatory pieces whereby said digit-pinion shaft is rotated always in the same direction; a pair of bevel-gears driven from said pinion-shaft and rotating as a single piece always in the same direction; a setting-pinion for setting up the digits; and means for bringing said setting-pinion into gear with one or the other of said bevel-gears, whereby the direction of rotation of said setting-pinion may be reversed.

23. In a calculating-machine, a setting-pinion; a pair of shiftable bevel-gears rotating as a single piece always in the same direction; means for rotating said bevel-gears a proper amount to set up the digits; a sliding reverser operative upon said bevel-gears to shift the same to bring one or the other of said bevel-gears into mesh with said pinion; a reversing-lever rotating about a fixed axis; and an eccentric connection between said reversing-lever and said reverser whereby the rotation of said lever controls the position of said reverser.

24. In a calculating-machine, the combination of a rotatable setting member; a rod for rotating the same a proper amount to set up the digits; and means for varying the angle of inclination of said rod for the purpose described.

25. In a calculating-machine, a setting-rod; means for rotating the same a proper amount to set up the digits; means for reversing the direction of rotation of said rod; and means for varying the angle of inclination of said rod.

26. In a calculating-machine, the combination of a setting-pinion for setting up the digits; a pair of bevel-gears rotating always in the same direction as a single piece, means for shifting one or the other of said bevel-gears into mesh with said setting-pinion; means for rotating said bevel-gears the proper amount to set up the digits; and a holder wherein said setting-pinion is journaled, said holder being revoluble about an axis coincident with the axis of said bevel-gears whereby the axis of said setting-pinion may be rotated to different positions without disengaging said setting-pinion from said bevel-gears.

27. In a calculating attachment to typewriters, the combination of a receiving and totalizing mechanism shiftable with the typewriter carriage; a stationary setting mechanism connected to a fixed part of the typewriter; and a member for transmitting motion from said setting mechanism to said receiving and totalizing mechanism, the angle of inclination of said connecting member being adjustable to thereby accommodate said receiving and setting mechanisms to typewriters of various constructions.

28. In a calculating-machine, a setting-wheel; a setting-pinion; a setting-rod for transmitting rotation from said setting-pinion to said setting-wheel; a fixed shaft; a holder wherein said setting-pinion is journaled, said holder being pivoted to said shaft; and means adapted to engage said setting-pinion for all angles thereof to rotate said pinion the proper amount to set up the digits.

29. In a calculating-machine, a setting-wheel; a setting-pinion; a setting-rod for transmitting rotation from said setting-pinion to said setting-wheel; a fixed shaft; a holder wherein said setting-pinion is journaled, said holder being pivoted to said shaft; a bevel-gear rotatably mounted upon said shaft for driving said setting-pinion; and means for rotating said bevel-gear a proper amount to set up the digits.

30. In a calculating-machine, a setting-wheel; a setting-pinion; a setting-rod for transmitting rotation from said setting-pinion to said setting-wheel; a fixed shaft; a holder wherein said setting-pinion is journaled, said holder being pivoted to said shaft; a pair of bevel-gears adapted to mesh one at a time with said setting-pinion, said bevel-gears rotating as a single piece; and means for rotating said bevel-gears the proper amount to set up the digits.

31. In a calculating attachment to typewriters, the combination of a receiving mechanism adapted to be supported from one portion of a type-writer; a setting-pinion adapted to be supported from another portion of the type-writer, said setting-pinion rotating different amounts to set up the different digits; and an extensible-rod connection for transmitting rotation from said setting-pinion to said setting-wheel whereby the distance between said setting-pinion and setting-wheel may be varied to facilitate the attaching of the device to different type-writers.

32. In a calculating attachment to type-writers, the combination of a receiving mechanism adapted to be supported from one portion of a type-writer; a setting-pinion adapted to be supported from a different portion of the type-writer, said setting-pinion rotating different amounts to set up the different digits; a setting-wheel operative upon said receiving mechanism; a rod connected to said setting-wheel for rotating the same; a separate setting-rod connected to and rotated by said setting-pinion; and a clamp connecting said rods whereby the operative lengths thereof may be varied.

33. In a calculating attachment to type-writers, the combination of a receiving and totalizing mechanism shiftable with the type-writer carriage; a stationary setting mechanism connected to a fixed part of the type-writer; and a member for transmitting motion from said setting mechanism to said receiving and totalizing mechanism, said connecting member being adjustable with reference to its length and angle of inclination to thereby accommodate said receiving and setting mechanisms to type-writers of various construction.

34. In a calculating-machine, a setting member for setting up the digits; a rotatable locking-shaft normally rotating always in the same direction for locking and correcting said setting member; and a series of independently-movable disk sectors for operating said locking-shaft, any one of said sectors being adapted to rotate said locking-shaft and finally bring it to rest in correct position to be subsequently operated by any one of said disk sectors.

35. In a calculating-machine, a setting member for setting up the digits; a rotatable locking-shaft for locking and correcting said setting member; and a series of sets of disk sectors for operating said locking-shaft, any one of said sets of disk sectors being adapted to rotate said locking-shaft and finally bring it to rest in correct position to be subsequently operated by any one of said sets of disk sectors.

36. In a calculating-machine, a setting member for setting up the digits; a rotatable locking-shaft for locking and correcting said setting member; and a series of sets of disk sectors for operating said locking-shaft, any one of said sets of disk sectors being adapted to rotate said locking-shaft and one of the sectors in each of said sets being adapted to bring said shaft positively to rest in correct position after the rotation of said shaft has been completed by such set of disk sectors, whereby said shaft is left in proper position to be subsequently operated by any one of said sets of disk sectors when the machine is again operated.

37. In a calculating-machine, a setting member for setting up the digits; a rotatable locking-shaft for locking and correcting said setting member; and a series of sets of disk sectors for operating said locking-shaft, any one of said sets of disk sectors being adapted to rotate said locking-shaft and one of the sectors of each of said sets being adapted to lock said locking-shaft in correct position for some period of time prior to the commencement of the rotation of said shaft by said sectors, thereby insuring to said shaft the proper position to be further operated.

38. In a calculating-machine, a setting member for setting up the digits; a rotatable locking-shaft for locking and correcting said setting member; and a series of sets of disk sectors for operating said locking-shaft, any one of said sets of disk sectors being adapted to rotate said locking-shaft and one of the sectors in each set being adapted to lock said shaft in correct position prior to the commencement of the rotation of said shaft, and another of the sectors in such set being adapted to lock said shaft in correct position after the completion of the rotation of said shaft to thereby insure the proper intermediate action of said sectors upon said shaft.

39. In a calculating-machine, a setting member for setting up the digits; a rotatable locking-shaft for locking and correcting said setting member; and a series of sets of disk sectors for operating said locking-shaft, any one of said sets of disk sectors being adapted to rotate said locking-shaft and each one of said sets comprising at least two disk sectors adapted to operate said shaft one after the other and each of said sectors being adapted first to rotate and then to lock said shaft for the purpose described.

40. In a calculating-machine, a setting member for setting up the digits; a rotatable locking-shaft for locking and correcting said setting member, and a series of sets of disk sectors for operating said locking-shaft, any one of said sets of disk sectors being adapted to rotate said locking-shaft and each of said sets having three disk sectors, the first sector of a set being adapted to first lock and then release said shaft, the second sector of a set being adapted to first rotate and then lock said shaft and then release said shaft, and the last sector being adapted to first rotate and then lock said shaft for the purpose described.

41. In a calculating-machine, a digit-pinion shaft for setting up the digits; digit-pieces for operating said shaft; a locking device operated by said digit-pieces and adapted to lock said digit-pinion shaft; means for connecting said digit-pieces with said pinion-shaft and also with said locking device for the forward motion of said digit-pieces; and means for disconnecting said digit-pieces from said pinion-shaft and from said locking device for the backward motion of said digit-pieces.

42. In a calculating-machine, a digit-pinion shaft for setting up the digits; digit-pieces for operating said shaft; a locking-shaft for locking said digit-pinion shaft; locking-pinions for operating said locking-shaft; projections on said digit-pieces for engaging said locking-pinions to drive the same; means for bringing said projections into operative relation with said locking-pinions for the forward motion of said projections; and means for removing said projections out of operative relation with said locking-pinions for the backward motion of said locking-pinions whereby said locking-pinions and said locking-shaft are rotated in one direction only.

43. In a calculating-machine, a digit-pinion shaft for setting up the digits; toothed laterally-shiftable digit-pieces for rotating said digit-pinion shaft; a locking-shaft for operating said digit-pinion shaft; locking-pinions for operating said locking-shaft; projections on said digit-pieces adapted to engage said locking-pinions; means for rotating said digit-pieces back and forth; means for shifting said digit-pieces into connection with said digit-pinion shaft and locking-pinions for the forward motion of said digit-pieces; and means for shifting said digit-pieces out of connection with said digit-pinion shaft and locking-pinions for the backward motion of said digit-pieces whereby said digit-pinion shaft and said locking-shaft are rotated in one direction only.

44. In a calculating-machine, a digit-pinion shaft for setting up the digits; toothed laterally-shiftable digit-pieces; toothed sectors thereon for rotating said digit-pinion shaft; a locking-shaft for locking said digit-pinion shaft; locking-pinions rotating about a fixed axis for operating said locking-shaft; a set of disk sectors on said digit-pieces adapted to alternately rotate and lock said locking-pinions during the forward rotation of said digit-pieces; means for rotating said digit-pieces back and forth; means for laterally shifting said digit-pieces to bring said toothed sectors into engagement with said digit-pinion shaft, and said disk sectors into engagement with said locking-pinions for the forward motion of said digit-sectors; and other means for laterally shifting said digit-pieces to bring said toothed sectors out of engagement with said digit-pinion shaft and said disk sectors out of engagement with said locking-pinions for the backward motion of said digit-pieces.

45. In a calculating-machine, a digit-pinion shaft rotating always in the same direction to set up the digits; a detent-corrector; a pinion on said shaft adapted to be locked by said detent-corrector; a detent-pinion, the teeth whereof are adapted to lock and unlock said detent-corrector upon each alternate rotary movement of said detent-pinion; means for rotating said detent-pinion to unlock said detent-corrector just prior to the rotation of said digit-pinion shaft; and means for again rotating said detent-pinion to lock said detent-corrector just after the rotation of said digit-pinion shaft.

46. In a calculating-machine, a digit-pinion shaft rotating always in the same direction to set up the digits; a detent-corrector; a pinion on said shaft adapted to be locked by said detent-corrector; a detent-pinion, the teeth whereof are adapted to lock and unlock said detent-corrector upon each alternate rotary movement of said detent-pinion; a locking-shaft; a series of pairs of locking-pinions on said locking-shaft; disk sectors for alternately rotating and locking said locking-pinions; and means for operating said disk sectors.

47. In a calculating-machine, a digit-pinion shaft rotating always in the same direction for setting up the digits; a series of digit-pinions on said shaft; a series of independently-rotatable digit-pieces independently shiftable into and out of line to mesh with said digit-pinions; key connections for rotating said digit-pieces back and forth; a detent-corrector for locking said digit-pinion shaft; and means for releasing said detent-corrector during the rotation of said pinion-shaft.

48. In a calculating-machine, a digit-pinion shaft rotating always in the same direction for setting up the digits; reciprocatory means for operating said digit-pinion shaft; a pinion on said shaft; a detent-corrector moving into and out of engagement with said pinion for locking and correcting the same; and a detent-pinion having teeth for alternately locking and releasing said detent-corrector, the teeth of said detent-pinion forcing said detent into engagement with said pinion on the digit-pinion shaft and the spaces between the teeth of said detent-pinion permitting the release of said detent-corrector; and means for alternately rotating and holding said detent-pinion to thereby bring the teeth thereof into and out of operative contact with said detent-corrector.

49. In a calculating-machine, a rotary member for setting up the digits; means for rotating said member to set up the digits; and means for locking and correcting said rotary member during its inactive periods, said locking and correcting means comprising a pinion 69 on said rotary member, a pivoted detent-corrector adapted to swing into and out of operative engagement with said pinion 69, a detent-pinion for operating said detent-corrector; and means for alternately rotating and holding said detent-pinion, the teeth of said detent-pinion being adapted to force said detent-corrector into engagement with said pinion 69 to lock the same, and the spaces between the teeth of said detent-pinion being adapted to release said detent-corrector.

50. In a calculating-machine, a rotary member for setting up the digits; a pinion 69 thereon for locking and correcting the same; a detent-corrector for locking and correcting said pinion 69; a rotating part 67 having a tooth adapted to rotate toward said detent-corrector to force the same into engagement with said pinion 69 and subsequently rotate away from said detent-corrector to release said detent-corrector and permit the same to recede from said pinion 69; a locking-shaft whereon said part 67 is rigidly fixed; and means for rotating said locking-shaft always in the same direction to bring the tooth of part 67 into and out of engagement with said detent-corrector.

51. In a calculating-machine, a setting-pinion for setting up the digits; a setting-pinion aliner for locking and correcting said pinion; a locking-shaft; means for alternately rotating and locking said locking-shaft; a pivoted part 68, connected to said setting-pinion aliner for forcing the same into engagement with said setting-wheel; and a pinion, 67, on said locking-shaft for operating said part 68, the teeth of said pinion being adapted to engage said part 68 to force said setting-pinion aliner into engagement with the setting-wheel, and the spaces between the teeth of said pinion being adapted to release said part 68.

52. In a calculating-machine, a setting-pinion for setting up the digits; a setting-pinion aliner for locking and correcting said pinion; a locking-shaft; a series of locking-pinions on said shaft; a series of disk sectors for alternately locking and rotating said locking-pinions; a pivoted part 68, connected to said setting-pinion aliner for forcing the same into engagement with said setting-wheel; and a pinion 67 on said locking-shaft for operating said part 68, the teeth of said pinion being adapted to engage said part 68 to force said setting-pinion aliner into engagement with the setting-wheel, and the spaces between the teeth of said pinion being adapted to release said part 68.

53. In a calculating-machine, a setting-pinion rotatable upon its own axis for setting up the digits; a swinging holder for said setting-pinion, said holder being revoluble about an axis inclined to the axis of said setting-pinion; a setting-pinion aliner mounted on said holder; a part 68 having a fixed axis; means for actuating said part 68 after the completion of the forward motion of said setting-pinion; and a slidable transmitting member connected to said aliner and said part 68 for transmitting motion from said part 68 to said setting-pinion aliner, said transmitting member having the form of a disk whereby it may maintain connection with said part 68 and said aliner in all positions of said holder.

54. In a calculating-machine, a digit-pinion shaft for setting up the digits; a series of digit-pinions rigidly fixed thereon for rotating the same; a locking-shaft; locking-pinions rigidly fixed on said shaft for operating the same; means operated by said locking-pinion shaft for locking said digit-pinion shaft; digit-pieces having means thereon for operating said digit-pinions and said locking-pinions; a shifter both revoluble and slidable upon a fixed axis for shifting said digit-pinion shaft and locking-pinion shaft lengthwise to thereby shift said digit-pinions and locking-pinions aside out of operative connection with said digit-pieces, said shifter having a cylindrical surface with grooves therein, and said locking-shaft and digit-pinion shaft having projections extending into the grooves in said shifter whereby the sliding movement of said shifter upon its axis causes a lengthwise move of said digit-pinion shaft and locking-shaft for the purpose described.

55. In a calculating-machine, the combination of a framework; a receiving and totalizing mechanism; a setting-pinion for operating said receiving mechanism; a digit-pinion shaft for operating said setting-pinion; a series of digit-pinions fixed to said shaft; independently-shiftable and independently-rotatable digit-pieces for operating said pinions; and connections from the keys to said digit-pieces for operating the latter.

56. In a calculating-machine, the combination of a framework; keys; a receiving and totalizing mechanism; a setting-pinion for operating said receiving mechanism; a locking-shaft for locking and correcting the said setting-pinion; a series of locking-pinions rigidly fixed on said shaft; independently-rotatable and independently-shiftable digit-pieces operated by said keys for operating said locking-pinions; and other means operated by said digit-pieces for rotating said setting-pinion the proper amount to set up the digits.

57. In a calculating-machine, the combination of a framework; a receiving and totalizing mechanism; a setting member for operating the said receiving and totalizing mechanism; reversing mechanism comprising a pair of bevel-gears for reversing the direction of rotation of said setting member; means for shifting said bevel-pinions for bringing one or the other thereof into connection with said setting member; and means connected to and operated by said keys for locking and rotating said setting member.

HYMAN ELI GOLDBERG.

Witnesses:
J. I. McDONALD,
HOWARD M. COX.